Jan. 10, 1967   J. W. MILLER   3,296,831
UNIVERSAL JOINT
Filed Feb. 25, 1965

INVENTOR.
JAMES W. MILLER
BY
William N. Antonis
ATTORNEY

United States Patent Office 3,296,831
Patented Jan. 10, 1967

3,296,831
UNIVERSAL JOINT
James W. Miller, South Bend, Ind., assignor to The Bendix Corporation, South Bend, Ind., a corporation of Delaware
Filed Feb. 25, 1965, Ser. No. 435,173
10 Claims. (Cl. 64—17)

This invention relates to universal joints and more particularly to a universal joint for use in a steering column.

More specifically, it is an object of this invention to provide a universal joint which can be inserted in a two-piece steering column so that the driver of a vehicle can adjust the steering wheel and column to any position which is deemed to be comfortable during operation of the vehicle.

Another object of this invention is to provide a universal joint of substantial strength which is relatively small in size.

A further object of this invention is to provide a universal joint which is constructed to have relatively long bearing areas.

A still further object of this invention is to provide a universal joint which is free from backlash and friction losses.

An important object of this invention is to provide a means or mechanism for eliminating backlash and frictional losses in a universal joint of the type which includes a pair of forked members which are positioned and connected at right angles with respect to each other through means of a block interposed between the forks and tapered conical pins interconnecting the forks and block.

Another object of this invention is to provide, in a universal joint of the type described, automatic wear compensation means for maintaining lash-free interconnections.

A further object of this invention is to provide a universal joint of the type described wherein the bores in the block for receiving the tapered conical pins intersect to form a cavity for containing a lubricant.

The above and other objects, features and advantages of the invention will become apparent from the following description taken in connection with the accompanying drawings which form a part of this invention and in which.

Figure 1:
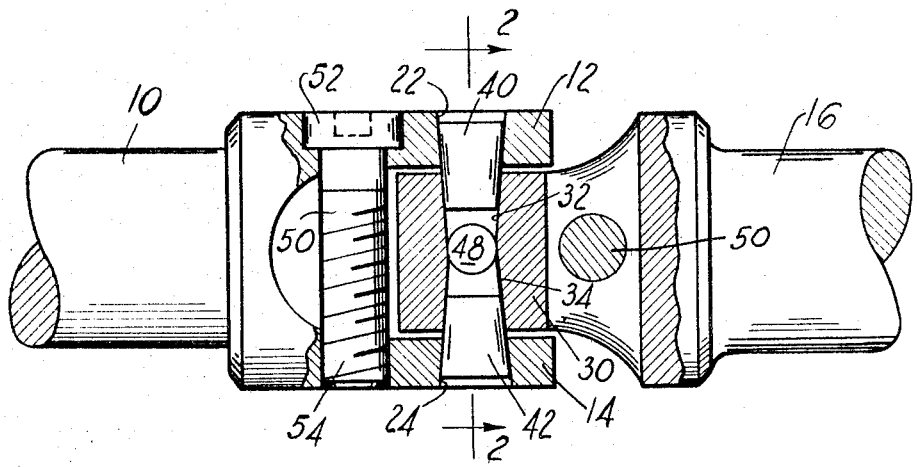
FIGURE 1 is a side view of the universal joint with portions thereof shown in section.
Figure 2:
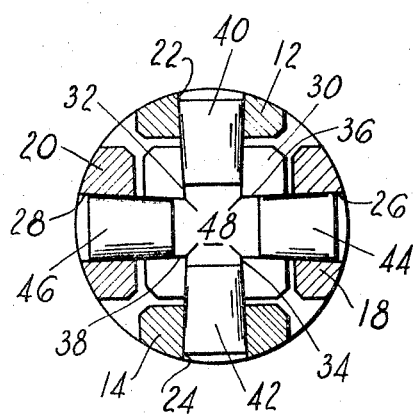
FIGURE 2 is a sectional view taken along line 2—2 of FIGURE 1.

Referring to FIGURES 1 and 2, it will be noted that numeral 10 indicates a forked shaft member having a pair of arms 12 and 14 located at one end thereof, and that numeral 16 indicates a second similar forked shaft member having a pair of arms 18 and 20 also located at one end thereof. Coaxial conical bores 22 and 24 are located in the arms 12 and 14, respectively, whereas similar coaxial conical bores 26 and 28 are located in arms 18 and 20, respectively. It will be noted that the coaxial bores 22 and 24 are centered in the same plane with the coaxial bores 26 and 28, but are located at right angles with respect thereto.

A block 30 is interposed between the spaced arms 12, 14, 18 and 20 and contains intersecting conical bores 32, 34, 36 and 38 disposed at right angles with respect to each other and in coaxial alignment with the conical bores of the spaced arms. Diametrically opposed conically tapered pins 40, 42, 44 and 46 have one end thereof located in arm bores 22, 24, 26 and 28, respectively, and the other end located in coaxially aligned block bores 32, 34, 36 and 38, respectively. The tapered pins are secured to the arms by suitable means such as staking, as shown by numeral 47 in FIGURE 3, which prevents outward movement of the pins with respect to the arms. A cavity 48 for containing a lubricant is formed by the intersecting bores of the block.

In order to eliminate backlash and frictional losses from the universal joint, suitable means, such as a threaded bolt or screw 50 which has the head end 52 located in a recess formed in one arm and the other end 54 threadedly engaging the oppositely disposed arm, are utilized. In this manner it is possible to achieve and control any desired preload level simply by adjusting, that is, by rotating the threaded member 50 within a given torque range. Thus, if the threaded member 50 is tightened, the oppositely disposed arms will be caused to move towards each other to thereby provide intimate lash-free contact between the conically tapered pins and the conical bores of the block. Through such an arrangement, it is possible to adjust the arms of the universal joint to any predetermined preload level and to maintain the preload level for a given period of time by subsequent adjustments, if necessary.

Figure 3:
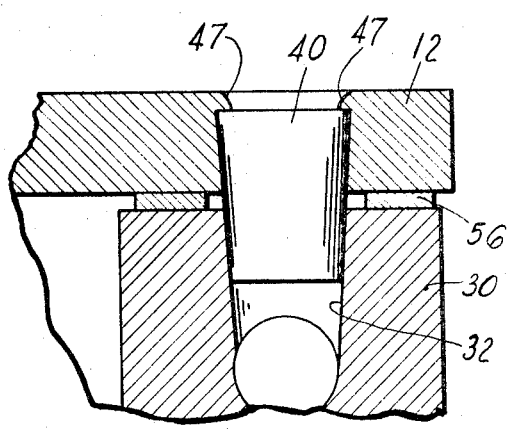
FIGURE 3 is a fragmentary sectional view of a portion of the universal joint showing an optional step in the method of making same.

If desired, during assembly of the universal joint, shims 56, as shown in FIGURE 3, may be inserted between each arm and the block to elastically spread such arms to positions away from their normally non-stressed positions. After the universal joint has been completely assembled, removal of the shims from between the pre-loaded arms and the block will permit movement of the elastically stressed arms towards their normally non-stressed positions. Such movement, obviously, will tend to maintain continuous intimate lash-free contact between the conically tapered pins and the conical bores of the block and thereby provide a certain amount of automatic wear compensation. In certain applications, the use of the torque adjusting screw 50 may not be necessary and the shim assembly procedure may be sufficient, in and of itself, to provide a lash-free joint for such applications.

The advantages and many applications of a universal joint of this type which can be adjusted and maintained substantially free of backlash and friction losses will be obvious to those skilled in the art. Furthermore, although this invention has been described in connection with a specific embodiment, it will be obvious to those skilled in the art that various changes may be made in the form, structure, and arrangement of parts without departing from the spirit of the invention.

Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A universal joint comprising two members capable of being rotated with their axes angularly disposed with respect to one another, a pair of spaced arms located at the end of each of said rotatable members, coaxial conical bores located in the arms of each of said rotatable members, said coaxial bores of one of said members being centered in the same plane with the coaxial bores of the other of said members but at right angles with respect thereto, a block interposed between said spaced arms, said block having intersecting conical bores disposed at right angles with respect to each other and in coaxial alignment with the conical bores of said arms, two pairs of diametrically opposed conically tapered pins each having one end thereof located in and secured to one of the bores in said arms and the other end thereof located in a coaxially aligned bore in said block, and means for urging the arms of each of said members towards each other to thereby provide intimate lash-free contact between the conically tapered pins and the conical bores of said block.

2. A universal joint, as defined in claim 1, wherein said last named means includes a threaded member extending through and engaging a pair of spaced arms for causing movement of said arms towards each other upon rotation of said threaded member.

3. A universal joint, as defined in claim 2, wherein said threaded member is a torque adjusting screw.

4. A universal joint, as defined in claim 1, wherein said last named means includes preloaded elastically stressed arms tending to move towards said block and a non-stressed position.

5. A universal joint, as defined in claim 1, wherein the intersecting conical bores of said block form a cavity therein for containing a lubricant.

6. A universal joint, as defined in claim 1, wherein the tapered pins are secured to the conical bores of said arms by staking.

7. A method of forming a lash-free universal joint for joining two angularly disposed rotatable members each having a pair of spaced arms with coaxial conical bores located at the ends thereof, said coaxial bores of one of said members being centered in the same plane with the coaxial bores of the other of said members but at right angles with respect thereto, comprising the steps of interposing between said spaced arms a block having intersecting conical bores disposed at right angles with respect to each other and in coaxial alignment with the conical bores of said arms, inserting two pairs of diametrically opposed conically tapered pins into the coaxially aligned conical bores of said arms and block, inserting a shim between each arm and said block to elastically spread said arms to positions away from their normally non-stressed positions, forcing said conically tapered pins into intimate contact with the conical bores of said block and securing said pins to said arms, and removing said shims from between said arms and said block to permit movement of said elastically stressed arms towards their normally non-stressed positions to thereby maintain continuous intimate lash-free contact between the conically tapered pins and the conical bores of said block.

8. A method of forming a lash-free universal joint, as defined in claim 7, wherein said pins are secured to said arms by staking.

9. A method of forming a lash-free universal joint for joining two angularly disposed rotatable members each having a pair of spaced arms with coaxial conical bores located at the ends thereof, said coaxial bores of one of said members being centered in the same plane with the coaxial bores of the other of said members but at right angles with respect thereto, comprising the steps of interposing between said spaced arms a block having intersecting conical bores disposed at right angles with respect to each other and in coaxial alignment with the conical bores of said arms, inserting two pairs of diametrically opposed conically tapered pins into the coaxially aligned conical bores of said arms and block, forcing said conically tapered pins into intimate contact with the conical bores of said block and securing said pins to said arms, and drawing each pair of oppositely disposed arms towards each other through means of an adjustable mechanism connecting said arms to thereby maintain continuous intimate lash-free contact between the conically tapered pins and the conical bores of said block.

10. A method of forming a lash-free universal joint, as defined in claim 9, wherein said adjustable mechanism includes a threaded member extending through and engaging each pair of spaced arms for causing movement of said arms towards each other upon rotation of said threaded member.

References Cited by the Examiner

UNITED STATES PATENTS

| | | | |
|---|---|---|---|
| 1,583,184 | 5/1926 | Sandberg | 64—17 |
| 1,845,794 | 2/1932 | Jeffrey | 64—17 |
| 3,217,516 | 11/1965 | Runkle | 64—17 |

FOREIGN PATENTS 205,757  9/1956  Australia.

FRED C. MATTERN, Jr., *Primary Examiner.*

HALL C. COE, *Examiner.*